United States Patent [19]
Falz et al.

[11] Patent Number: 5,259,147
[45] Date of Patent: Nov. 9, 1993

[54] GRANULAR ABRASIVE MATERIAL

[75] Inventors: Wolfgang Falz, Ronnenberg; Günter Bigorajski, Gehrden; Herbert Exner, Wedemark, all of Fed. Rep. of Germany

[73] Assignee: Vereinigte Schmirgel-und Maschinenfabriken Aktiengesellschaft, Hanover, Fed. Rep. of Germany

[21] Appl. No.: 22,743

[22] Filed: Feb. 18, 1993

Related U.S. Application Data

[63] Continuation of Ser. No. 938,508, Aug. 31, 1992, abandoned, which is a continuation of Ser. No. 713,006, Jun. 10, 1991, abandoned, which is a continuation of Ser. No. 518,336, May 7, 1990, abandoned, which is a continuation of Ser. No. 302,122, Jan. 26, 1989, abandoned, which is a continuation of Ser. No. 942,263, Dec. 16, 1986, abandoned.

[30] Foreign Application Priority Data

Feb. 15, 1986 [DE] Fed. Rep. of Germany ....... 3604848

[51] Int. Cl.$^5$ .............................................. B24D 3/00
[52] U.S. Cl. .......................................... 51/293; 51/308; 51/309; 428/148; 501/126; 501/127; 501/128; 501/132
[58] Field of Search ................ 51/293, 308, 309; 428/148, 149; 501/126, 127, 128, 132

[56] References Cited

U.S. PATENT DOCUMENTS

| 2,278,442 | 4/1942 | Heany | 501/127 |
| 2,311,228 | 2/1943 | Heany | 501/127 |
| 2,339,264 | 1/1944 | Heany | 501/127 |
| 2,347,685 | 5/1944 | Heany | 501/127 |
| 3,802,893 | 4/1974 | Kiger et al. | |
| 3,871,891 | 3/1975 | Schuller et al. | 501/127 |
| 3,891,408 | 6/1975 | Rowse | 51/295 |
| 3,909,991 | 10/1975 | Coes | 51/309 |
| 4,314,827 | 2/1982 | Leitheiser et al. | 51/298 |
| 4,384,046 | 5/1983 | Nakagami | 501/95 |
| 4,518,397 | 5/1985 | Leitheiser et al. | |
| 4,574,003 | 3/1986 | Gerk | 51/309 |
| 4,643,983 | 2/1987 | Zeiringer | 501/127 |

FOREIGN PATENT DOCUMENTS

| 1195848 | 10/1985 | Canada | 57/19 |
| 024099 | 2/1981 | European Pat. Off. | |
| 152768 | 8/1985 | European Pat. Off. | |
| 0171034 | 2/1986 | European Pat. Off. | |
| 944936 | 11/1961 | United Kingdom | |

*Primary Examiner*—Mark L. Bell
*Assistant Examiner*—Willie J. Thompson
*Attorney, Agent, or Firm*—Penrose Lucas Albright

[57] ABSTRACT

A granular abrasive material is produced from a dispersion consisting of raw materials containing alumina, compounds containing silica and other additives. The dispersion is ground to a sinterable slip with a grain size of less than 1 micrometer. The slip is dried and may be pressed before being subjected to a multi-stage heating process to produce sintered corundum crystals.

8 Claims, No Drawings

GRANULAR ABRASIVE MATERIAL

This application is a continuation of Ser. No. 938,508, filed Aug. 31, 1992, abandoned Apr. 30, 1993, which is a continuation of Ser. No. 713,006, filed Jun. 10, 1991, abandoned Sep. 25, 1992, which is a continuation of Ser. No. 518,336, filed May 7, 1990, abandoned Aug. 8, 1991, which is a continuation of Ser. No. 302,122, filed Jan. 26, 1989, abandoned May 5, 1990, which is a continuation of Ser. No. 942,263, filed Dec. 16, 1986, abandoned Mar. 16, 1989.

BACKGROUND OF THE INVENTION

1. Technical Field

The present invention relates to granular abrasive material and, more specifically, to a method of producing it.

2. Prior Art

Fused alpha-aluminum oxide corundum produced in electric smelting processes, for example in electric arc furnaces, is the major material used for the production of abrasive tools by the entire abrasives industry.

The raw materials used to produce the normal fused forms of corundum are bauxite, prepared either directly from the natural state or chemically into calcined alumina, as well as additives, e.g. reduction coke and scrap iron. The calcined alumina is extracted by thermal processing from aluminium oxide primarily obtained by the Bayer process. The calcined alumina contains varying amounts of alpha-aluminium oxide and representatives of gamma-aluminium oxides depending on calcining temperature and time.

Grinding tools, made with the bauxite or alumina forms of corundum obtained from melts, when tested under established test conditions, give a specific time-related degree of abrasion and are found to have a specific service life, which can be measured in terms of the volume or weight of material ground away. Improvements of the grinding performance of normal forms of fused corundum have been achieved by thermal after-treatment processes (blue calcination of bauxite forms of corundum) or by alloying with other metal oxides, e.g. chromium oxide or zirconium oxide. Fed. Rep. German Patent Specification No. 22 27 642, describes fused corundum consisting of aluminium oxide and zirconium oxide in a eutectic composition (approximately 57 weight % $Al_2O_3$ and 43 weight % $ZrO_2$). The material has a two-phase, microcrystalline solidification structure, obtained by the spontaneous cooling of the melt. This material, which will be referred to as "Zirkonkorund", has a superior grinding performance (time-related wear and service life) relative to the normal fused forms of corundum. The high cost of zirconium oxide and the expensive process for the necessary fast cooling, make granular "Zirkonkorund" from five to six times more expensive than normal fused corundum.

The increased performance of "Zirkonkorund" abrasive material as compared with normal corundum falls abruptly when grinding metal materials, such as steel, as the grain size is reduced and substantially levels off at a grain size of P80, that is the grains will pass through an 80 mesh sieve as defined by FEPA (the European Federation of Manufacturers of abrasive products). This result is also observed with other high performance abrasives.

A highly effective granular, abrasive corundum based on fused aluminum oxide is described in Fed. Rep. German Patent Application No. 32 19 607. This high grade granular fused corundum abrasive material is made by dispersing very fine crystalline aluminum oxide monohydrate in nitric acid and water containing other dissolved metal-containing sintering aids to produce a gel which, after careful drying, is prereduced down to abrasive grain size. The material is then calcined at a temperature between 250° C. and 800° C. to remove the chemically bound water and the acidic residues, primarily nitrogen oxides, which are extremely toxic and damaging to the environment.

The granular material is then heated to sintering temperatures of up to 1650° C. until a density of at least 85% of the theoretical density is achieved.

Similar methods of production of granular abrasive, corundum materal are described in European Patent Application No. 0 024 099A and U.S. Pat. No. 4,518,397. These methods require that the dispersed aluminum oxide monohydrate used as the raw material can only be contaminated with a maximum of 0.05% by weight of alkali or alkaline earth metal ions.

In the method described in European Patent Application No. 0 152 768A the colloidal solution or gel is additionally ground in a vibration grinding mill, as a result of which a sintered product of increased density and with no large surface areas on the particles is produced. The material is formed of homogeneously orientated alpha-aluminium oxide crystallites. It is common to all the four methods mentioned above that they can be carried out only by a colloidal solution/gel process with a very finely dispersed aluminium oxide monohydrate of boehmite type. These relatively expensive raw materials can only be obtained by means of the hydrolysis of aluminium organic compounds. This together with the costly process technology results in such colloidal solution/gel abrasives costing several times more than normal sintered forms of corundum.

Although sintered corundum material, e.g. tabular alumina, costs less it has a definitely worse abrasion performance relative to fused forms of corundum and is therefore quite unsuitable for general use in grinding tools.

SUMMARY OF THE INVENTION

It is an object of the invention to provide a method of economically producing granular abrasive material which is distinctly superior to the normal forms of fused corundum as regards grinding performance.

In accordance with the invention a dispersion, as opposed to a colloidal gel, of material containing alumina, compounds containing silica and other metal-containing additives is ground to a particle size of less than one micrometer, preferably less than 0.1 micrometer, to a slip which can be sintered. The dried slip is subjected to a multi-stage heat treatment.

Preferably, the dried ground slip is compacted in a press.

The multi-stage heat treatment preferably includes three stages. In the first stage the dried ground slip is preheated to about 250°-600° C. In the second stage the preheated slip is further heated to about 1100°-1400° C. and held at this temperature for 10 to 30 minutes. In the third stage the slip is further heated to about 1400° to 1700° C. and sintered to a density of more than 85% of the theoretical density of corundum such as to produce corundum crystals including both alpha-aluminium oxide and a silicate phase, and the diameter of the corundum crystals is less than 5 micrometers.

Advantageously, the diameter of the corundum crystals is less than 1 micrometer.

In an alternative embodiment the multi-stage heat treatment consists of two stages. The dried ground slip is preheated in the first stage to about 250°–600° C., and in the second stage, to about 1400°–1700° C.

DESCRIPTION OF PREFERRED EMBODIMENTS

The present method uses raw materials that are advantageous in cost terms and which are subjected to a definite ceramic perparation, so that a definite calcining curve is kept to, in order to produce a sintered corundum of very finely crystallized form which has at least 85% of the theoretical density of corundum. The resulting granular abrasive material contains as its principal constituent alpha-aluminium oxide, and as accessory constituents, a silicate phase as well as at least one crystalline compound of bivalent, trivalent or quadrivalent metals or a combination thereof. The term "accessory constituents" means that their sum does not exceed 45% by weight. The crystalline compounds may be simple or compound oxides, such as spinels. They can either be distributed as separate phases in the matrix e.g. zirconium oxide, or also be fully or partly dissolved in the corundum lattice, e.g. chromium oxide. The silicatic phase may be present fully or partly as glass. The silicate phase is preferably from 0.3 to 10% by weight. The proportion of said metal oxides is from 0.2 to 45% by weight.

The corundum crystals of the granular abrasive material should have a diameter smaller than 5 micrometers, preferably smaller than 2 micrometers, and advantageously smaller than 1 micrometer. The crystallographic axes of the material are randomly distributed.

In a sintered colloidal solution/gel abrasive, for example as described in Fed. Rep. German Patent Application No. 32 19 607, the crystallites over areas of 0.5–20 micrometers are homogeneously orientated. This restriction disappears when the present method is employed since a colloidal solution and subsequent gelling are not used. Moreover, the raw materials in the present method do not have to be capable of forming such a solution.

The material produced by the present method is differentiated from other sintered aluminum oxides by its regular, very fine crystalline structure and the particular multiples composition which gives the abrasive grain its increased toughness and outstanding abrasive properties, and thus makes it a high performance abrasive grain with superior grinding properties. For the production of the abrasive material it is possible to use simple and economic raw materials, e.g. aluminium hydroxide or calcined alumina obtained from it, either alone, or in a mixture. There are no restrictions as regards purity, as demanded in the method described in European Patent Application No. 0 024 099A or fineness or specific surface, as demanded in the references given above and also in Fed. Rep. German Patent Application No. 32 19 607. The calcined alumina can contain alpha-aluminum oxide in amounts of 0 to 98%.

The alumina-containing raw materials are used together with 0.3 to 8 weight %, preferably 1 to 2 weight % of $SiO_2$, as well as with 0.2 to 12 weight %, preferably 1 to 6 weight % of a spinel-forming bivalent metal oxide, or another compound of the metals: silicon, zirconium, titanium, chromium, iron, magnesium, zinc, cobalt and nickel, and possible further additives. The dispersion produced from these raw materials is subjected to wet grinding. The indications given are calculated as percentages by weight of the corresponding oxides and refer to the amount of finished abrasive.

The grinding process can take place in an aqueous suspension or in a suspension in an organic liquid and is carried out until substantially all the particles of raw material employed have sizes smaller than 1 micrometer, preferably, however, smaller than 0.1 micrometer. "Substantially all" means in this specification more than 95% relative to the overall volume of solid material. Any grinding process may be used which supplies the required degree of fineness.

The ground material, dried or freed from organic solvents is then subjected to the actual sintering process either directly or at the end of further mixing and compacting processes. Preferably the material is compacted by dry pressing which is preferably carried out isostatically. Drying may be effected at temperatures between 50° and 600° C., preferably between 100° and 160° C. The reduction of the formed or unformed material to abrasive grain size may be effected both before and after the completion of the sintering process.

The ceramic calcining of the lumpy or comminuted, formed or unformed material to sintered abrasive grain is effected in several steps. In the first heating stage the material is carefully brought to a temperature between 250° and 600° C., and held at the latter temperature for some minutes. This step is used for the expulsion of the chemically bound water or for the burning out of any organic components. Thereafter, the material is quickly brought to a temperature between 1100° and 1400° C., again held at this level for 10 to 30 minutes, and then heated quickly to a temperature between 1400° and 1700° C., preferably 1450°–1550° C. and sintered to a density of over 85% of the theoretical density. If the starting raw materials contain no aluminium hydroxide $Al(OH)_3$, the second step may be omitted and the material may be heated directly from the first calcination stage to a final sintering temperature. Calcination temperatures higher than suggested, lengthy sintering periods and slow rates of heating up reduce the abrasion performance of the finished material. The superiority of the sintered abrasive grain produced by this method over conventional fused corundum will be illustrated in the following examples which are not intended to show the entire range of methods falling within the scope of the invention.

EXAMPLE 1

A mixture of 2000 g calcined alumina, 1000 g aluminium hydroxide, 42 g quartz powder, 130 g magnesium oxide, 5 liters water and 250 ml 60% acetic acid, is subjected to intensive grinding in a ball mill to prepare a slip in which substantially all the particles have a size smaller than 0.1 micrometers. The slip is carefully dried in an electrically-heated drier. This slip thus dewatered is pulverised and calcined for 45 minutes at 500° C. Subsequently, from this powder, and with the aid of an isostatic press, at a pressure of 2 Kbar, lumps are produced which are then heated in an electrically-heated laboratory furnace. The furnace is brought up from ambient temperature to 600° C., in about 60 minutes and then quickly heated up to 1300° C., is about 10 minutes and held at this temperature for 20 minutes. Then, the temperature is raised to 1500° C. in less than 5 minutes and the lumps are calcined for a further 30 minutes. After cooling, the density is established at 93% of the theoretical density and the lumps are crushed in a jaw crusher. From the crushed material a granular material abrasive is sieved out to grain size P36 of the FEPA standard, and processed in the usual manner as an abrasive on a support. For this purpose a support of vulcanized fiber as available in the trade of 0.84 mm thickness is provided with a binding agent. The binder consists of some 50% of a liquid phenol-resol with a phenol to formaldehyde ratio of about 1:1.5 and a solids ratio of about 80%, as well as of some 50% ground chalk with an average particle size of about 20 micrometers. It is applied by means of a doctor blade coating method in an amount of about 230 g per sq.m. Subsequently, according to a process usual for the production of abrasive on a support, the abrasive grain of P36 size is electrostatically deposited on the vulcanized fiber coated with resin, in an amount of approximately 900 grams per square meter. The coated support is then dried and hardened according to a temperature pattern usual for this purpose. Subsequently, by means of roller coating, a second binding coating is applied in an amount of approx. 490 g/m². For the second coating the same binder system is used as for the basic coating but some 50% by weight of the chalk is replaced by synthetic cryolite. The coated vulcanic fiber is subsequently heated for 30 minutes to 90° C., 60 minutes to 100° C., 30 minutes to 110° C., 30 minutes to 120° C., and then finally about 60 minutes to 130° C., so that the binder system is hardened. After drying, the abrasive on vulcanized fiber support is evenly flexibilized and discs of 125 mm diameter are punched out, to be reclimatized in the usual manner to a moisture level of less than 8%.

The vulcanized fiber grinding discs thus obtained were tested on a commercially available high frequency plate grinding apparatus against cold-rolled fine metal plates of CK45-03 (DIN 17200) of size 500×100×2 mm. For this purpose the grinding disc is inclined with an angle of attack of 10 degrees and rotated at a speed of 6500 r.p.m., five times per cycle for a duration of 9.5 seconds each time over the lone edge of the steel plate. Subsequently the amount of cut test material is determined by weighing. The contact pressure is initially at the start of the test 40N and is increased with each new cycle by 5N to a constant loading of 60N. The test is continued until less than 10 g is cut in a cycle. The total of metal removed is then the grinding performance of the test disc in grams. For comparison purposes, a vulcanized fiber grinding disc is made with normal fused corundum of P36 grain size. This disc is otherwise identical to the other disc and is made in the same way. The comparison disc was tested under the same conditions. The grinding performance of this disc is taken to be 100% for the relative comparison.

The disc manufactured with sintered abrasive grain according to the method of invention achieved a grinding performance of 350% compared with the grinding performance of the comparison disc coated with normal fused corundum.

EXAMPLE 2

A starting mixture is prepared from 2500 g calcined alumina, 50 g quartz powder, 150 g magnesium oxide, 6 liters water and 240 ml 90% acetic acid. From this mixture a granular abrasive material according to the method of Example 1 is produced. The resulting material has a density of 94% of the theoretical density. The material is processed in a similar manner to Example 1 to produce vulcanized fiber discs, and tested. On testing, the abrasive performance achieved is 374% of the grinding performance of the comparison disc coated with normal corundum.

EXAMPLE 3

The method of Examples 1 and 2 is (essentially) repeated but with a mixture of 2500 g calcined alumina, 35 g quartz powder, 75 g zirconium silicate, 150 g magnesium oxide, 5 liters water and 240 ml 90% acetic acid. The isostatically compressed lumps are heated slowly to 600° C. and then quickly to 1250° C. and kept there for 25 minutes. Then the temperature is raised quickly to 1450° C., and the lumps are sintered for 30 minutes to a density of 93% of the theoretical density. The grinding test is carried out in the manner already described and yields a grinding performance of 384% of that of a vulcanized fiber grinding disc coated with normal corundum.

EXAMPLE 4

Following the method of Example 1, using a starting mixture of 2500 g calcined alumina, 40 g quartz powder, 125 g magnesium oxide, 225 grams citric acid and 4 liters of water, a ground slip is prepared with particle sizes of mainly less than 0.1 micrometers. The slip is carefully dried for 24 hours. During this time the suspension shrinks to a solid which is soft yet nonetheless brittle. The individual lumps are crushed in a jaw crusher, and the fraction of the crushed material comprised between 0.5 and 1 mm is separated. The sieved material is packed into an aluminium oxide crucible and heated slowly in an electrically-heated furnace from ambient temperature to 500° C. and held at that level for 100 minutes. Then the temperature is quickly raised in 15 minutes to 1500° C. and kept constant for 45 minutes. The sintered material is hard and resistant and has a density of 95% of the theoretical density of corundum. With the granular abrasive material of FEPA P 36 size obtained, vulcanized fiber abrasive discs are made according to the method of Example 1. The grinding test yields a result of 381% of the grinding performance of the comparison disc coated with normal corundum.

EXAMPLE 5

A granular abrasive material is made according to the method of Example 4 using a starting mixture of 2500 g calcined alumina, 45 g quartz powder, 125 g magnesium oxide, 225 g citric acid and 4 liters water. On this occasion the sintering temperature is only 1450° C. The grinding test supplies a performance of 414% of that of the comparison disc coated with normal corundum, and 135% of the grinding performance of a vulcanized fiber abrasive disc coated with "Zirkonkorund".

EXAMPLE 6

The method of Example 5 is repeated but with 50 instead of 45 g quartz powder. The precrushed ground material is heated slowly for 8 hours from ambient temperature to 1500° C. and there sintered for 12 hours. The finished granular abrasive material has a density of 97% of the theoretical density of corundum and a crystallite diameter of more than 1 micrometer. The grinding test yields a grinding performance of 289% of the grinding performance of a vulcanized fiber disc coated with normal corundum and still 95% of the grinding performance of a grinding disc coated with "Zirkonkorund".

The described method may also be used for the production of ceramic lumps from already sintered aluminium oxide. In this particular case the subsequent crushing of the lumps to abrasive grain size is eliminated.

We claim:

1. A method for producing granular abrasive material including the steps of:

forming a dispersion of solid materials containing alumina, compounds containing silica, and other additives selected from compounds of the metals; silicon, zirconium, titanium, chromium, iron, magnesium, zinc, cobalt or nickel, in water and/or an organic compound, said dispersion containing sufficient alumina to provide a content of at least fifty-five weight percent alpha-aluminum oxide in the produced granular abrasive materials;

grinding said solid materials of said dispersion until said solid materials of said dispersion are reduced to particles of which substantially all have a particle size of less than 0.1 micrometer to produce a sinterable slip;

drying the ground dispersion of said solid material; and subjecting said dried dispersion to at least a two stage heat treatment including a first stage wherein said dried dispersion is preheated to between 250° and 600° C. for the expulsion of chemically bound water and/or organic compounds, and a subsequent stage wherein said preheated dried dispersion is heated to between 1400° and 1700° C. to sinter it to a density of more than eighty-five percent of the theoretical density of corundum such as to produce said granular abrasive material comprising both alpha-aluminum oxide and a silicate material and wherein the diameters of the crystals of said alpha-aluminum oxide are less than one micrometer.

2. A method according to claim 1, wherein said sinterable slip is compacted in a press prior to said heat treatment.

3. A method according to claim 1, wherein said materials containing alumina are selected from the group consisting of calcined alumina, aluminium hydroxides, and mixtures thereof.

4. A method according to claim 1, wherein said heat treatment comprises three stages and includes a second stage intermediate said first stage and said subsequent stage, said second stage including heating said preheated slip to between 1100° and 1400° C. and maintaining this temperature for a period of from ten to thirty minutes.

5. A method according to claim 4, wherein in the finished granular abrasive material the proportion of said silicate phase is from 0.3 to 10% by weight.

6. A method according to claim 4, wherein said abrasive granular material includes further simple or complex metal oxides dissolved or dispersed in the corundum matrix in addition to said alpha-aluminium oxide and silicate phase.

7. A method according to claim 6, wherein the proportion of said metal oxides is from 0.2 to 45% by weight.

8. A method according to claim 5, wherein said silicate phase in said finished granular abrasive material is present as glass.

* * * * *